(12) United States Patent  
Araki

(10) Patent No.: US 8,004,781 B2  
(45) Date of Patent: Aug. 23, 2011

(54) MAGNETIC TRANSFER APPARATUS, MAGNETIC TRANSFER METHOD AND MAGNETIC RECORDING MEDIUM WITH MAGNETIC INFORMATION TRANSFERRED THERETO

(75) Inventor: Minoru Araki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 204 days.

(21) Appl. No.: 12/334,743

(22) Filed: Dec. 15, 2008

(65) Prior Publication Data

US 2009/0180206 A1 Jul. 16, 2009

(30) Foreign Application Priority Data

Dec. 14, 2007 (JP) .................................. 2007-323753

(51) Int. Cl.  
*G11B 5/86* (2006.01)

(52) U.S. Cl. .......................................................... 360/17

(58) Field of Classification Search .................. None  
See application file for complete search history.

(56) References Cited

U.S. PATENT DOCUMENTS 7,050,248 B1 * 5/2006 Wang .............................. 360/16  
7,170,698 B2 * 1/2007 Kamatani ...................... 360/17

FOREIGN PATENT DOCUMENTS

| JP | 2003-173523 | 6/2003 |
|---|---|---|
| JP | 2004-079027 | 3/2004 |
| JP | 2004-103111 | 4/2004 |
| JP | 2004-127443 | 4/2004 |
| JP | 2004-206794 | 7/2004 |
| JP | 2006-196120 | 7/2006 |
| JP | 2008-130204 | 6/2008 |

OTHER PUBLICATIONS

Japanese Official Action Notice of Rejection—2007-323753—Nov. 19, 2010.

\* cited by examiner

*Primary Examiner* — Daniell L Negrón  
(74) *Attorney, Agent, or Firm* — Young & Thompson

(57) ABSTRACT

A magnetic transfer apparatus and method includes air supply for supplying air into a space above a peripheral portion of a double-sided slave disc beyond a second master disc in an air-tight chamber formed when a first disc holder holding a first master disc and the slave disc in contact and a second disc holder holding the second master disc are brought into contact with each other so as to hold and sandwich the slave disc between the first and second master discs, the air supply being controlled to take place at least either during formation of the air-tight chamber or during opening the air-tight chamber.

15 Claims, 13 Drawing Sheets

MAGNETIC TRANSFER APPARATUS, MAGNETIC TRANSFER METHOD AND MAGNETIC RECORDING MEDIUM WITH MAGNETIC INFORMATION TRANSFERRED THERETO

BACKGROUND OF THE INVENTION

1. Field of the Invention

The present invention relates to a method of and an apparatus for magnetically transferring a pattern of magnetic information on a master disc to a slave disc to be used as a magnetic recording medium in disc drives such as hard disc drives and floppy disc drives, and to a magnetic recording medium with magnetic information recorded thereon.

2. Description of Related Art

In recent years, in a distribution system of magnetic discs such as hard discs for use with rapidly widespread hard disc drives, it is the common practice to magnetically write various information, e.g. format information and address information on such a magnetic disc before installing the magnetic disc into a disc drive in a disc drive production site alter delivery from the disc manufacturer. Although the information writing can be performed by use of a magnetic head, it is preferred in terms of efficiency of writing to employ a master disc with magnetic information including format and address information magnetically written therein for performing blanket magnetic transfer of the magnetic information to the magnetic disc.

In performing of the blanket magnetic transfer, a slave disc (magnetic disc) is held tight between two master discs supported by recessed disc holders, respectively, by moving one of the disc holders to the other. Then, a space formed between the recessed disc holders is sealed up by an O-ring as a sealing member to provide an air-tight chamber. In this sealed state, air in spaces around inner and outer peripheries of the discs in contact in the air-tight chamber is evacuated sufficiently enough to bring the master discs and the slave disc into intimate contact with one another without any air gap between contact surfaces of the discs due to residual air. In this way, the slave disc is firmly held between the two master discs in intimate contact. This holding manner facilitates simplified, reliable magnetic transfer.

However, when implementing such evacuation of air from the spaces formed around the inner and outer peripheries of the discs in contact in the air-tight chamber by means of vacuum suction, holding power acting on the discs in contact is reduced, so that the discs tend to move relatively to one another and, in consequence, loose coaxial alignment. If the slave disc is out of coaxial alignment with the master discs, a pattern of magnetic information is at risk of being off-centrally transferred on the slave disc. In particular, in the case where the slave disc is held by the master discs without contact with anything else in terms of prevention of contamination, air is constantly evacuated from the air-tight chamber. In consequence, the slave disc is locally subjected to negative pressure, so as to tend to cause displacement relative to the master discs. Furthermore, when opening the air-tight chamber by moving one of the disc holders away from the other, the slave disc held on the other disc holder is apt to be dragged by the master disc held on the moving disc holder due to mutual adhesion of mirror finished surfaces of the slave and master discs. This incurs the risk of irregular stop of the magnetic transfer apparatus.

It is therefore an object of the present invention to provide a method and an apparatus for magnetic transfer which prevents an occurrence of relative displacement between master and slave discs during evacuation of air from an air-tight chamber formed between disc holders and also prevents the slave disc from being dragged by the master disc during opening the air-tight chamber and further to provide a magnetic recording medium to which magnetic information has been transferred from the master disc by use of the magnetic transfer method and apparatus.

SUMMARY OF THE INVENTION

In one aspect of the present invention there is provided a magnetic transfer apparatus for magnetically transferring patterned magnetic information of a master disc to a double-sided slave disc by applying a magnetic field to the master disc in contact with the double-sided slave disc. The magnetic transfer apparatus comprises first disc holder means having a recess for holding a first master disc, having a spindle hole, and a double-sided slave disc, having a spindle hole smaller than the spindle hole of the master disc, in contact with each other therein; second disc holder means having a recess for holding a second master disc, having the same spindle hole as the first master disc, therein; shifting means for shifting the first and second disc holder means relatively toward each other to form an air-tight chamber between the recesses of the first and second disc holder means and to bring the double-sided slave disc into contact with the second master disc so as to sandwich it between the first and second master discs concurrently with formation of the air-tight chamber and relatively away from each other to open the air-tight chamber; air supply means for supplying air into a space formed above a peripheral portion of the double-sided slave disc beyond the second master disc; and control means for controlling the air supply means to supply air into the space above the peripheral portion of the double-sided slave disc beyond the second master disc at least either during formation of the air-tight chamber or during opening the air-tight chamber. The space is more specifically such as formed between the spindle hole of the second master disc and an inner periphery of the double-sided slave disc extending inwardly beyond the second master disc.

According to the magnetic transfer apparatus, air which is supplied into the space formed above a peripheral portion of the double-sided slave disc beyond the second master disc during formation of the air-tight chamber acts as retentive force on the double-sided slave disc, so as to prevent an occurrence of displacement of the double-sided slave disc relative to the first and second master discs. On that account, the double-sided slave disc is maintained in correct coaxial alignment with the first and second master discs. Further, the air supplied into the space acts as retentive force on the double-sided slave disc also during opening the air-tight chamber, the double-sided slave disc is prevented from being dragged by the second master disc and remains in contact with the first master disc. The air supply means may controlled to supply air at a supply rate per unit of time different between during formation of the air-tight chamber and during opening the air-tight chamber.

The magnetic transfer apparatus may further comprises air evacuation means for evacuating air from the air-tight chamber so as to hold the first master disc and the double-sided slave disc in contact on the first disc holder means with a vacuum. In this instance, the air supply means supplies air so as to develop positive pressure in the space above the peripheral portion of the double-sided slave disc beyond the second master disc. The positive pressure locally developed on the double-sided slave disc acts as retentive force, the double-sided slave disc is prevented from an occurrence of displacement due to the evacuation of air.

The air supply means includes an air supply passage open to the space above a peripheral portion of the double-sided slave disc beyond the second master disc ether in a plane flush with, or in a plane slightly beyond above, the double-sided slave disc to be placed in contact with the first master disc held on the first disc holder means. This configuration of the air supply means facilitates reliable air supply above the double-sided slave disc, so as to reliably prevent an occurrence of displacement of the double-sided slave disc relative to the master discs.

The control by the control means may be such that, while the air supply means supplies air into the space above the peripheral portion of the double-sided slave disc beyond the second master disc, the air evacuation means evacuates air from the air-tight chamber so as to hold and sandwich the double-sided slave disc between the fist and second master discs in intimate contact with one another. By way of this control, air supplied into the space during holding and sandwiching the double-sided slave disc between the first and second master discs prevents an occurrence of displacement of the double-sided slave disc even during evacuation of air from the air-tight chamber.

The control by the control means may further be such that the second disc holder means is slightly moved toward the first disc holder means by the shifting means still after formation of the air-tight chamber between the first and second disc holder means so as thereby to subsidiarily apply mechanical thrust force onto the double-sided slave disc through the second master disc. This facilitates firm hold of the double-sided slave disc between the first and second master discs without contact with anything else even while air is constantly evacuated from the airtight chamber and prevents contamination of the double-sided slave disc.

In anther aspect of the present invention there is provided a magnetic transfer method, which is practiced by the magnetic transfer apparatus, comprising the steps of shifting a first disc holder means having a recess in which a first master disc and a double-sided slave disc are held in contact with each other and a second disc holder means having a recess in which a second master disc is held relatively toward each other to form an air-tight chamber between the recesses of the first and second disc holder means; holding and sandwiching the double-sided slave disc between the first and second master discs concurrently with formation of the air-tight chamber; magnetically transferring patterned magnetic information of the first and second master discs to the double-sided slave disc at opposite surfaces thereof; and shifting back the first and second disc holder means relatively away from each other to open the air-tight chamber. At least either in the step of holding and sandwiching the double-sided slave disc between the first and second master discs or in the step of opening the air-tight chamber, air is supplied into a space formed above a peripheral portion of the double-sided slave disc, more specifically, such as formed between the spindle hole of the second master disc and an inner periphery of the double-sided slave disc extending inwardly beyond the second master disc.

The slave disc holding and sandwiching step may be preformed by means of evacuation of air from the air-tight chamber. In this instance, the space formed above a peripheral portion of the double-sided slave disc is maintained under positive pressure by air supplied thereinto.

The space may be supplied with air either from a plane flush with, or from a plane slightly beyond above, the double-sided slave disc placed in contact with the first master disc. Further, the space may be supplied with air at a supply rate per unit of time different between the step of holding and sandwiching the double-sided slave disc between the first and second master discs and the step of opening the air-tight chamber. In the slave disc holding and sandwiching step, the air-tight chamber may be evacuated of air so as to hold and sandwich the double-sided slave disc between the first and second master discs in intimate contact with one another while the space is supplied with air from above the peripheral portion of the double-sided slave disc.

Furthermore, in the slave disc holding and sandwiching step, the first and second disc holder means are slightly moved relatively toward each other still after formation of the air-tight chamber between the first and second disc holder means so as thereby to subsidiarily apply mechanical thrust force onto the double-sided slave disc through the second master disc.

In a further aspect of the present invention there is provided a magnetic recording medium comprising a double-sided slave disc to which patterned magnetic information are magnetically transferred from master discs by way of the magnetic transfer method as described above.

BRIEF DESCRIPTION OF THE DRAWINGS

The foregoing and other objects and features of the present invention will be clearly understood from the following detailed description when reading with reference to the accompanying drawing wherein same and similar parts are denoted by the same reference numerals throughout the drawings and in which.

DESCRIPTION OF THE PREFERRED EMBODIMENTS

Figure 1:
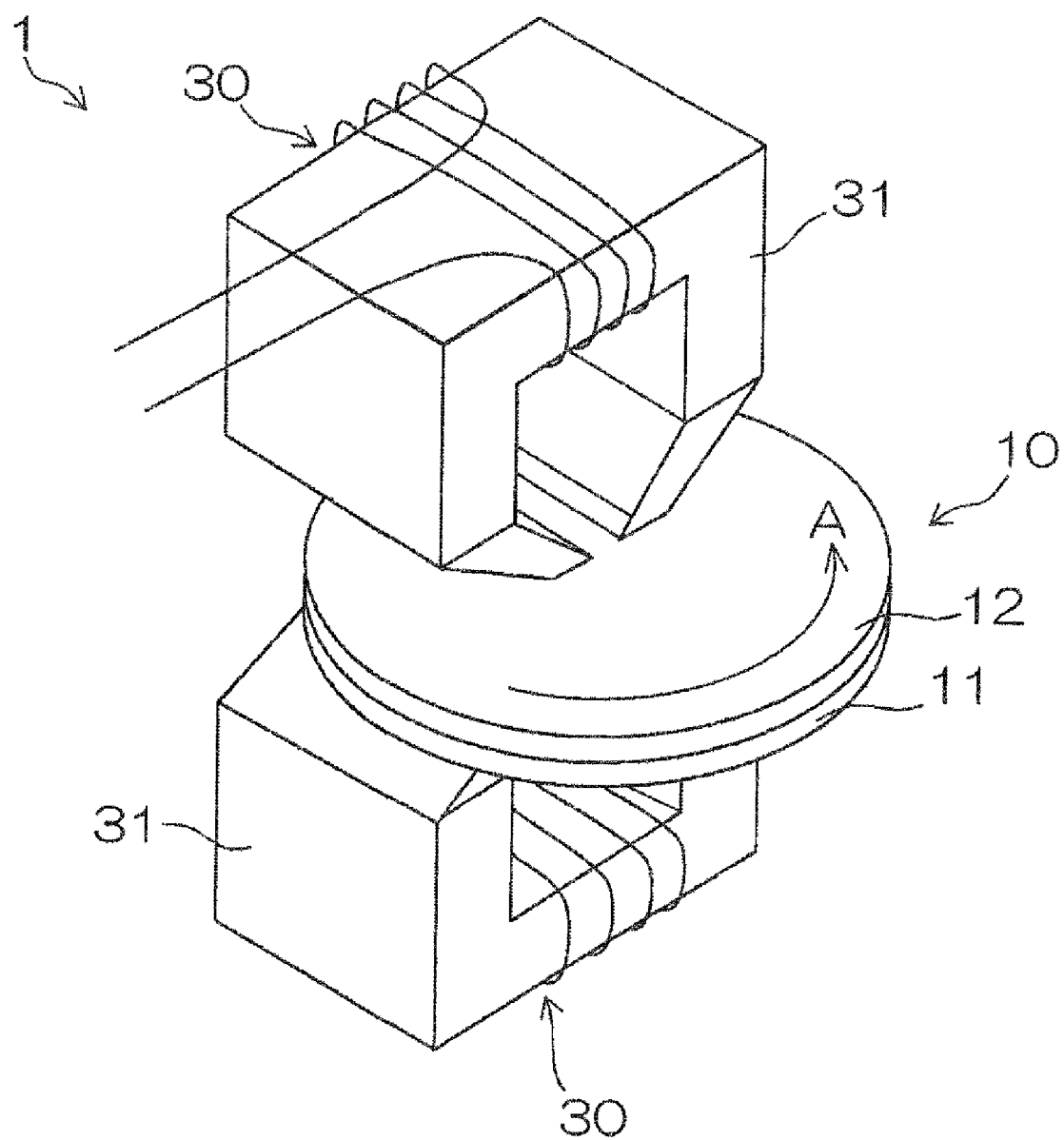
FIG. 1 illustrates, in schematic, simplified conceptualized view, a magnetic transfer apparatus.

Referring to the drawings in detail and, mote particularly, to FIG. 1 illustrating a horizontal axis type of magnetic transfer apparatus 1 for performing magnetic transfer on a double-sided slave disc (which is hereinafter simply referred to as a slave disc) by use of two master discs which have spindle holes smaller than that of the slave disc, the magnetic transfer apparatus 1 basically comprises at least a pair of magnetic field generating means 30 having cylindrical electromagnets 31, respectively, placed opposite each other and a magnetic transfer unit 10 placed between the magnetic field generating means 30. The magnetic transfer nit 10 includes a first or stationary disc holder unit 11 and a second or movable disc holder unit 12 each of which holds a master disc and which are movable relatively toward and away from each other. Although there is not shown in FIG. 1, the magnetic transfer apparatus 1 is accompanied by gas supply/suction means, disc manipulation means for manipulation a slave disc into and removing it from the magnetic transfer nit 10, drive means for causing relative rotation between the magnetic transfer nit 10 and the magnetic field generating means 30.

Figure 2:
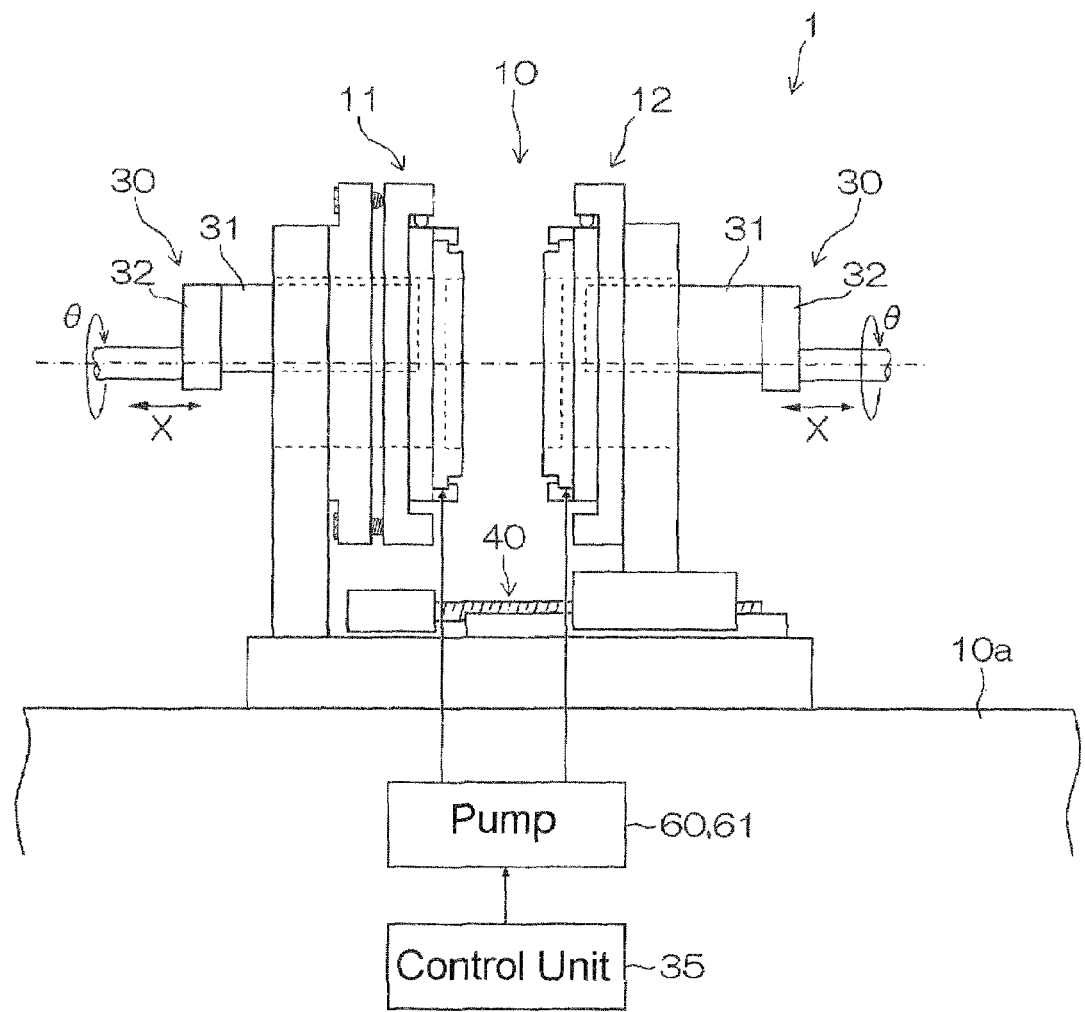
FIG. 2 illustrates, in schematic, simplified side view, a magnetic transfer apparatus according to an embodiment of the present invention.

Referring to FIG. 2 illustrating the magnetic transfer apparatus 1 in detail according to an embodiment of the present invention, the magnetic transfer nit 10 is emplaced on an installation base 10a such that the stationary and movable disc holder units 11 and 12 are positioned with their axes of rotation oriented horizontal and brought into intimate contact with each other so as to form air-tightly enclosed spaces therebetween. The magnetic field generating means 30 associated with each disc holder unit 11, 12 includes drive means 32 rotatable in a direction θ and linearly movable in a horizontal direction X which holds the electromagnet 31. Each disc holder unit 11, 12 is connected to a gas or air supply/suction system including a pump unit having an air supply pump 60 and an vacuum pump 61 and control devices such as valves (not shown) for controlling air flows to and from the disc holder unit 11, 12. The air supply/suction system is controlled in operation by a control unit 35.

Figure 3:
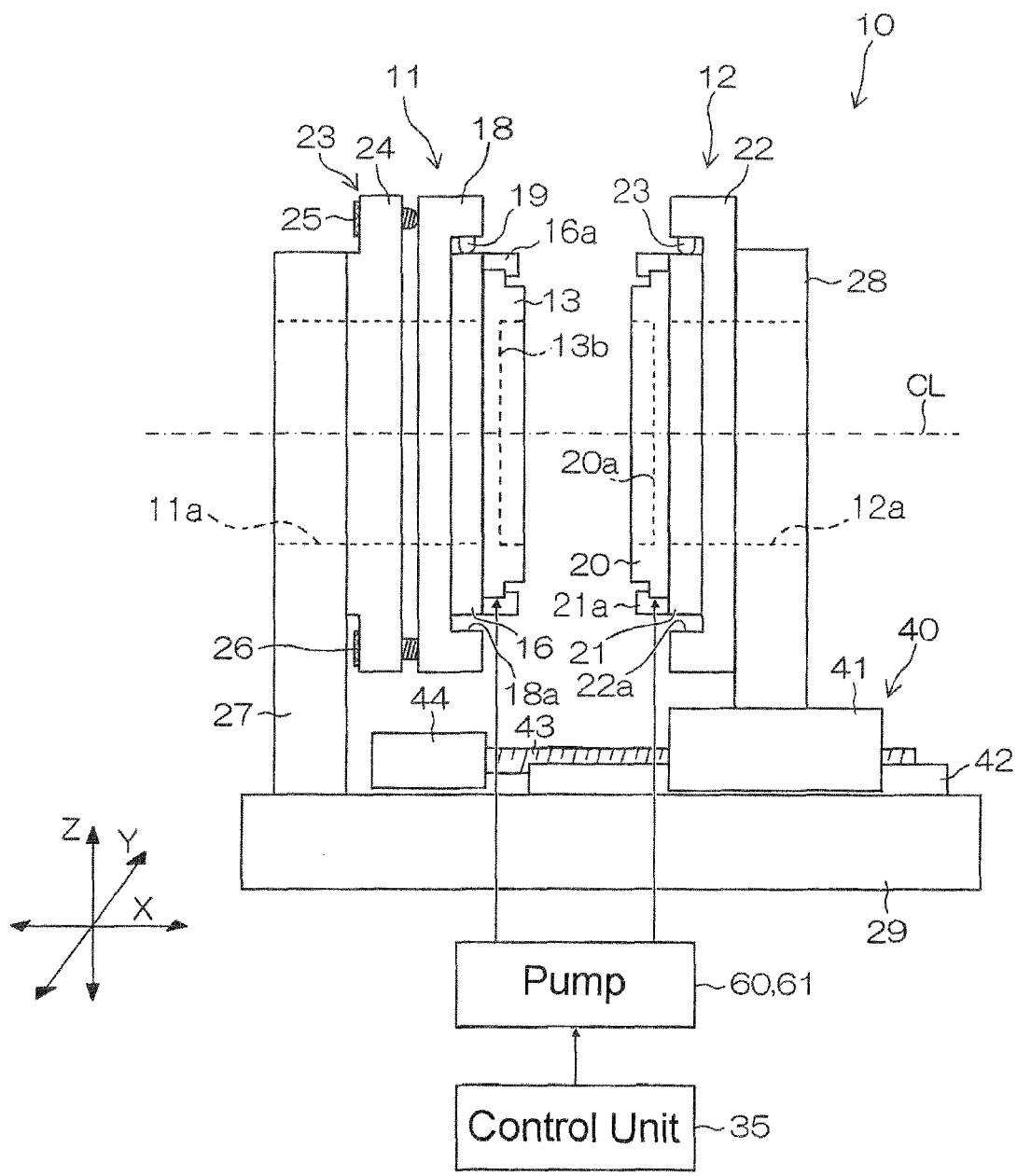
FIG. 3 illustrates, in schematic, simplified side view, a magnetic transfer unit of the magnetic transfer apparatus.

Referring to FIG. 3 illustrating a structure of the magnetic transfer nit 10 in detail, the magnetic transfer nit 10 is provided with a tilt adjusting means 23 for adjusting a tilt of the stationary disc holder unit 11 in directions Y and Z and a and shifting means 40 for shifting a position of the movable disc holder unit 12 relative to the stationary disc holder unit 11 in a direction X. These tilt adjusting means 23 and shifting means 40 are provided on a base platform 29. More specifically, the tilt adjusting means 23 comprises a mounting plate 27 vertically fixed to the base platform 29, a tilting base 24 fixed to the mounting plate 27 and four fine adjustment screws 25 and four clamp screws 26 arranged alternately at regular angular intervals in a circle in the tilting base 24. Each fine adjustment screw 25 is of a thrust type and has a ball tip end. Each clamp screws 26 is of a drawing type.

The stationary disc holder unit 11 comprises a disc holder 13 having a recess 13p for holding a slave disc and a master disc therein, an intermediate retaining fixture 16 having a plurality of claw hooks 16a arranged at regular angular intervals along a periphery thereof for retaining the disc holder 13 and a holder base 18 having a recess 18a for receiving the intermediate retaining fixture 16 therein. The holder base 18 is provided with a positioning and fixing screws 19 for laterally pushing the intermediate retaining fixture 16 against positioning portions formed on an inner wall of the holder base 18 so as to position and fix the intermediate retaining fixture 16 in the holder base 18. This positioning and fixing structure facilitates easy reassemble of the intermediate retaining fixture 16 with the disc holder 13 retained thereon with reproducible result of positioning. In consequence, it is enabled to perform alignment of axes CL of slave and master discs with a desired position of the disc holder 13 outside the magnetic transfer apparatus 1. The stationary disc holder unit 11 has an axial bore 11a, passing throughout the intermediate retaining fixture 16, the holder base 18, the tilting base 24 and the mounting plate 27, which receives the cylindrical electromagnet 31 of the magnetic field generating means 30 therein for rotation about the axis CL.

The shifting means 40 comprises a slide table 41 mounted on a guide rail 42 fixed to the base platform 29 for linear slide movement in a direction X, a ball screw 43 threaded in the slide table 41 and a motor 44 for turning the ball screw 43 to move the slide table 41 back and forth in the direction X. The slide table 41 fixedly mounts the movable disc holder unit 12 thereon.

The movable disc holder unit 12, which is fixedly attached to a mounting plate 28 vertically fixed to the slide table 41 and comprises a disc holder 20 having a recess 20a for holding a master disc therein, an intermediate retaining fixture 21 having a plurality of claw hooks 21a arranged at regular angular intervals along a periphery hereof for retaining the disc holder 20 and a holder base 22 having a recess 22a for receiving the intermediate retaining fixture 21 therein. The holder base 22 is provided with a positioning and fixing screw 23 for laterally pushing the intermediate retaining fixture 21 against positioning portions formed on an inner wall of the holder base 22 so as to position and fix the intermediate retaining fixture 21 in the holder base 22. This positioning and fixing structure facilitates easy reassemble of the intermediate retaining fixture 21 with the disc holder 20 retained thereon with reproducible result of positioning. This positioning and fixing structure facilitates easy reassemble of the intermediate retaining fixture 21 with the disc holder 20 retained thereon with reproducible result of positioning. In consequence, it is enabled to perform alignment of an axis CL of a second master disc 93 held on the disc holder 20 with the axes CL of the slave disc 91 and a first master disc 93 held in contact on the disc holder 13 outside the magnetic transfer apparatus 1. The movable disc holder unit 12 has an axial bore 12a, passing throughout the intermediate retaining fixture 21, THE holder base 22 and the mounting plate 28, which receives the cylindrical electromagnet 31 of the magnetic field generating means 30 therein for rotation about the axis CL. The movable disc holder unit 12 thus structured is moved toward and away from the stationary disc holder unit 11 by means of the shifting means 40. Therefore, the slave disc 91 held by the disc holder 13 of the stationary disc holder unit 11 is put between and in intimate contact with the first and second master discs 92 and 93 from both sides by bringing the movable disc holder unit 12 toward the stationary disc holder unit 11. Details of the disc holders 13 and 20 of the stationary and movable disc holder unit 11 are illustrated in FIG. 4.

Figure 4:
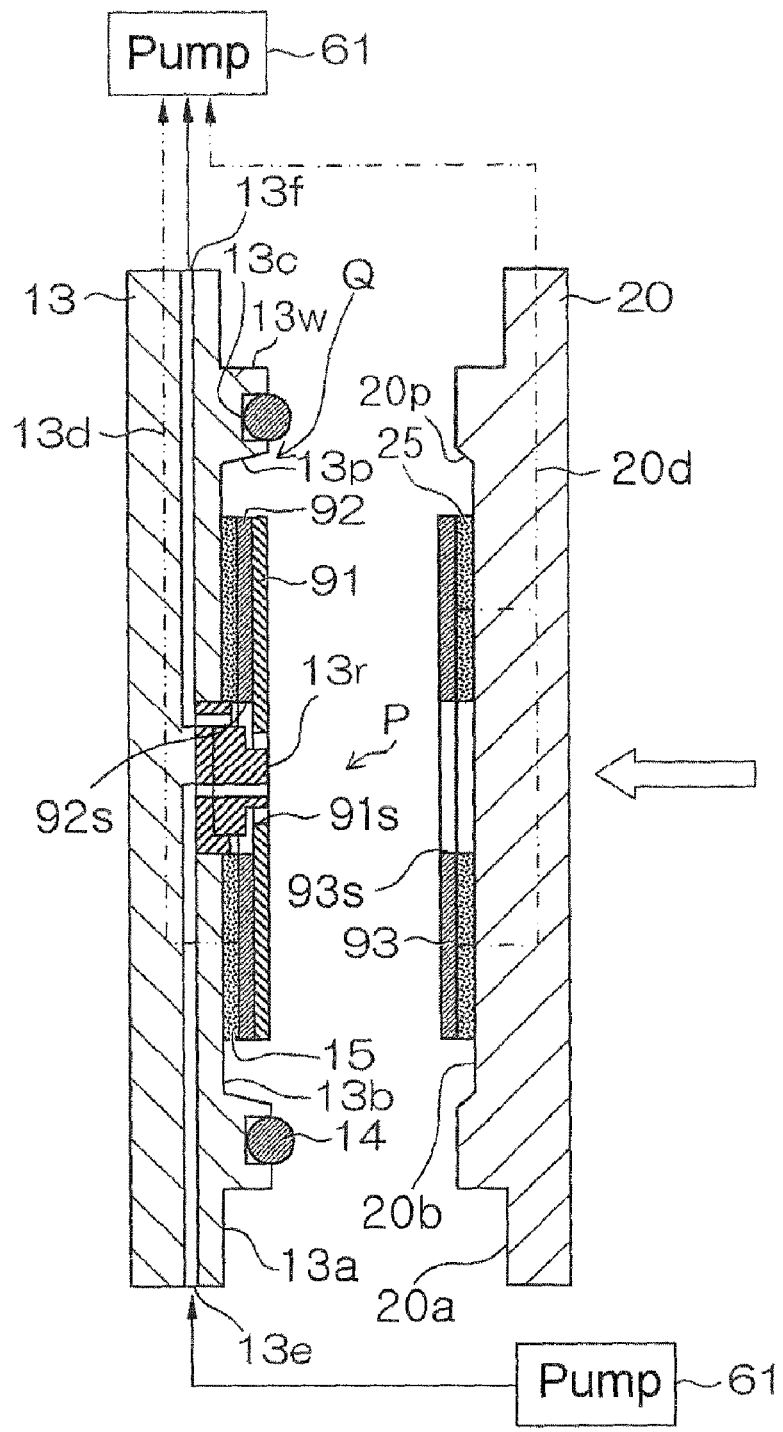
FIG. 4 illustrates, in detailed cross-sectional view, a stationary disc holder and a movable disc holder of the magnetic transfer unit.
Figure 5:
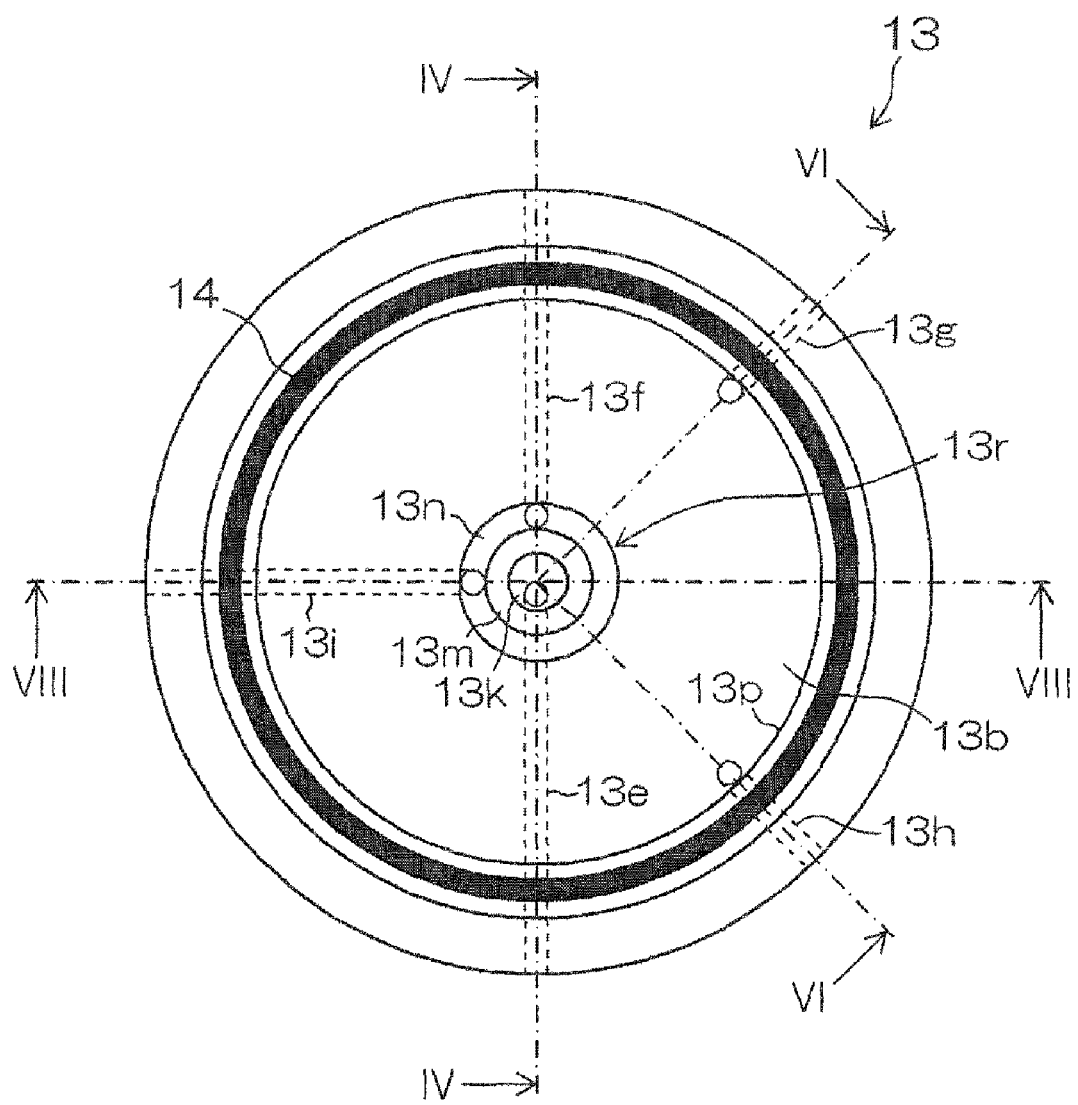
FIG. 5 illustrates, in front view, the stationary disc holder.
Figure 6:
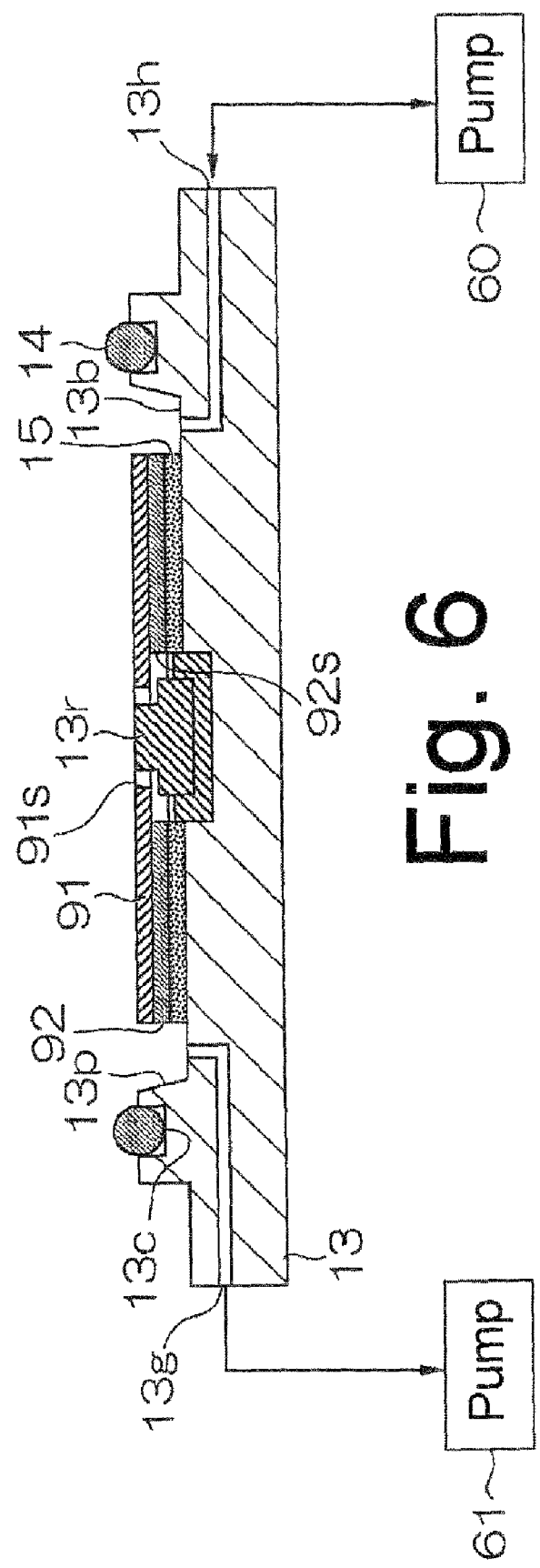
FIG. 6 illustrates, in detailed cross-sectional view along a line VI-VI in FIG. 5, the stationary disc holder.
Figure 7:
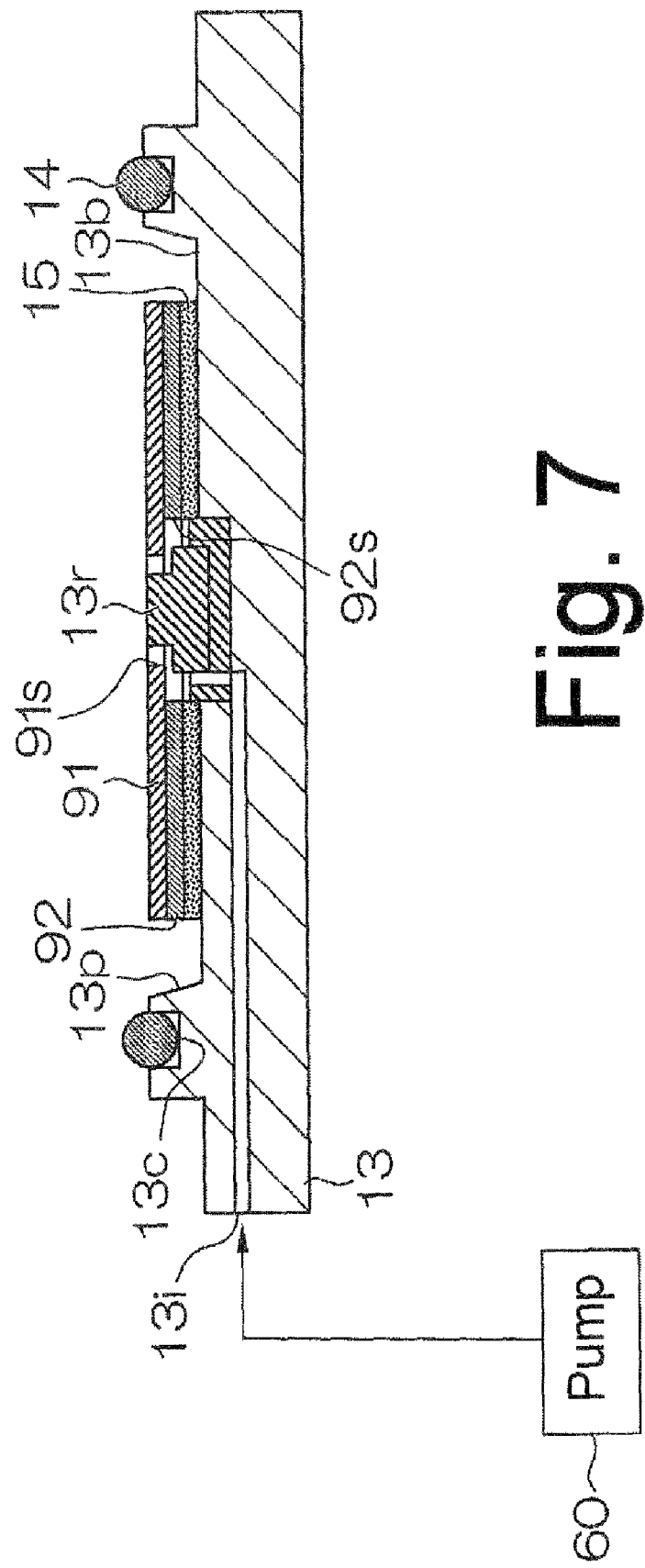
FIG. 7 illustrates, in detailed cross-sectional view along a line VII-VII in FIG. 5, the stationary disc holder.

Referring to FIG. 4 illustrating the disc holders 13 and 20 of the stationary and movable disc holder units 11 and 12, respectively, and FIGS. 5, 6 and 7 illustrating the disc holder 13 of the stationary disc holder unit 11, As shown in FIGS. 4, 6 and 7 illustrating, in cross-sectional views taken along lines IV-IV, VI-VI and VII-VII in FIG. 5, respectively, the disc holder 13 comprises a disc-shaped holder having a peripheral shoulder 13a which is engaged by the plurality of claw hooks 16a so that the disc holder 13 is held down against the intermediate retaining fixture 16. The disc holder 13 has a recess 13p having a bottom surface 13b serving as a support for a disc received in the disc holder 13 and a solid-core center boss 13r, in the form of an integral part of the disc holder 13 or a separate part fixed to the disc holder 13, extending in the recess 13p. The center boss 13r has a top end 13k and double shoulders, namely an inner shoulder 13m and an outer shoulder 13n (see FIG. 5). More specifically, the center boss 13r is so configured that the top end 13k has an outside diameter smaller than a diameter of the spindle hole 91s of the slave disc 91 and the first shoulder 13m has an outside diameter larger than the diameter of the spindle hole 91s of the slave disc 91 but smaller than a diameter of the spindle hole 92s of the first master disc 92 so as thereby to provide an air gap between the center boss 13r and the slave disc 91. The disc holder 13 is provided with a disc-shaped cushioning pad 15 which is fitted on the outer shoulder 13n of the center boss 13r to support the first master disc 92 and the slave disc 91 fitted on the center boss 13r. The disc holder 13 is provided with three radial air passages, namely an air supply passage 13e, an air suction passage 13f and an air supply passage 13i. The air supply passage 13e extends from an outer periphery of the disc holder 13 and turns upward into the recess 13p passing through the top end 13k of the center boss 13r. The air suction passage 13f extends diametrically opposite to the air supply passage 13e from the outer periphery of the disc holder 13 and turns upward into the recess 13p passing through the outer shoulder 13n of the center boss 13r. The air supply passage 13i extends perpendicularly to the air supply passage 133 and the air suction passage 13f from the outer periphery of the disc holder 13 and turns upward into the recess 13p passing through the outer shoulder 13n of the center boss 13r. The disc holder 13 is further provided with two peripheral air passages extending directly into the recess 13p from the periphery of the disc holder 13, namely an air suction passage 13g at an angle of 45° with the air suction passage 13f on a semicircular side opposite to a semicircular side on which the air supply passage 13i is provided and an air suction passage 13g at an angle of 45° with the air supply passage 13e on the same semicircular side on which the air suction passage 13g is provided. The disc holder 13 is further provided with an air suction passage 13d extending beyond the center boss 13r from the outer periphery of the disc holder 13 and turning upward into the recess 13p. The air supply passages 13e, 13h and 13i are connected to the air supply pump 60. The air suction passages 13d, 13f and 13g are connected to the vacuum pump 61. The disc holder 13 is provided with a sealing means such as an O-ring 14 received in a groove 13c formed in a peripheral wall 13w.

As shown in FIG. 4, the disc holder 20 comprises a disc-shaped holder having a peripheral shoulder 20a which is engaged by the plurality of claw hooks 21a so that the disc holder 20 is held down against the intermediate retaining fixture 22. The disc holder 20 has a recess 20p having a bottom surface 20b serving as a support for a master disc received in the disc holder 20 and is provided with a disc-shaped cushioning pad 25 fixedly attached to the bottom surface 20a. The disc holder 20 is provided with an air suction passage 20d extending beyond the center from the outer periphery of the disc holder 13 and turning upward into the recess 20p. The air suction passage 20d is connected to the vacuum pump 61.

When evacuating air through the air suction passage 13f, the slave disc 91 and the first master disc 92 are brought into contact with each other and is pressed against the disc-shaped cushioning pad 15 by means suction air acting on the slave disc 91 exposing to the air gap. On the other hand, when evacuating air through the air suction passage 20d, the second master disc 93 is pressed against the disc-shaped cushioning pad 25. When moving the movable disc holder unit 12 to the stationary disc holder unit 11 until the disc holder 20 is brought into contact with the disc holder 13 while evacuation of air out through both air suction passages 13d and 20d, there are formed enclosed spaces between the recesses 13p and 20p of the disc holders 13 and 20, and the slave disc 91 is brought into contact with the first and second master discs 92 and 93 at opposite sides concurrently. More specifically, the disc holders 13 and 20 are so configured that when the second master disc 93 on the cushioning pad 25 is brought into contact with the slave disc 91 in intimate contact with the first master disc 92 on the cushioning pad 15, a peripheral wall of the disc holder 20 abuts against the O-ring 14 of the disc holder 13 so as thereby maintaining the closed spaces air tightly. After forming the air tight spaces, when evacuating air from the enclosed spaces, more specifically an inside space P formed between the center boss 13r and the spindle holes 91s and 93s of the slave disc 91 and the second master disc 93 and an outside space Q formed around the slave disc 91 and the first and second master discs 92 and 93, through the air suction passages 13f and 13g of the disc holder 13, air locally retained in an interface between the master and slave discs 91 and 92 and an interface between the slave and master discs 91 and 93 are extracted into the inside and outside spaces P and Q, so that the slave disc 91 is brought into intimate contact with and sandwiched between the first and second master discs 92 and 93. In this instance, in order for the magnetic transfer unit 10 to apply a stable magnetic field to the three discs 91 to 93, it is preferred that components of at least the stationary and movable disc holder units 11 and 12, the tilt adjusting means 23 and the mounting plates 27 and 28 are made from non-magnetic materials such as, e.g. SUS304.

The magnetic transfer apparatus 1 performs magnetic transfer in the process as described below. First of all, the magnetic transfer unit 10 is adjusted in posture as a preparatory step. That is, the stationary disc holder unit 11 is adjusted in posture so as to put the disc support surface 13b of the disc holder 13 into parallel with the disc support surface 20b of the disc holder 20. This posture adjustment is accomplished by turning at least three of the adjustment screws 25 and the clamp screws 26 of the tilt adjusting means 23. Subsequently, the disc holder 13 is adjusted in position with respect to an outer periphery of the intermediate retaining fixture 16 as a reference position so as to bring axis lines CL of the slave disc 91 and the first master disc 92 held by the disc holder 13 in concurrence with a desired position, and fixedly retained on the intermediate retaining fixture 16. The disc holder 13 is retained by the claw hooks 16a and fixed by set screws. This positioning and fixing operation is done as an external set-up operation outside the magnetic transfer apparatus 1. The prepared holder assembly is attached to the holder base 18 by driving the fixing screws 19 against the intermediate retaining fixture 16 received within the recess 18a of the holder base 18. In this way, accurate positioning of the intermediate retaining fixture 16 is recreated due to positional restriction by a bottom surface of the recess 18a as a restriction surface.

In the similar manner, the disc holder 20 is adjusted in position so as to bring the axis line CL of the second master disc 93 held by the disc holder 20 in concurrence with a desired position, and fixedly retained on the intermediate retaining fixture 21. The disc holder 20 is retained by the claw hooks 21a and fixed by set screws. This positioning and fixing operation is done also as an external set-up operation outside the magnetic transfer apparatus 1. The prepared holder assembly is attached to the holder base 22 by driving the fixing screws 23 against the intermediate retaining fixture 21 received within the recess 22a of the holder base 22. In this way, the disc holders 13 and 20 are adjusted in posture and position to align their axis lines CL with each other.

Subsequently, the first master disc 92 is attached to the disc holder 13 and retained through evacuation of air through the air suction passage 13d. On the other hand, the second master disc 93 is attached to the disc holder 20 and retained through evacuation of air through the air suction passage 20d. When once attaching and retaining the first and second master discs 92 and 93 to the disc holders 13 and 20, respectively, magnetic transfer is repeatedly accomplished by replacing the slave disc 91 with blank slave discs.

Figure 8:
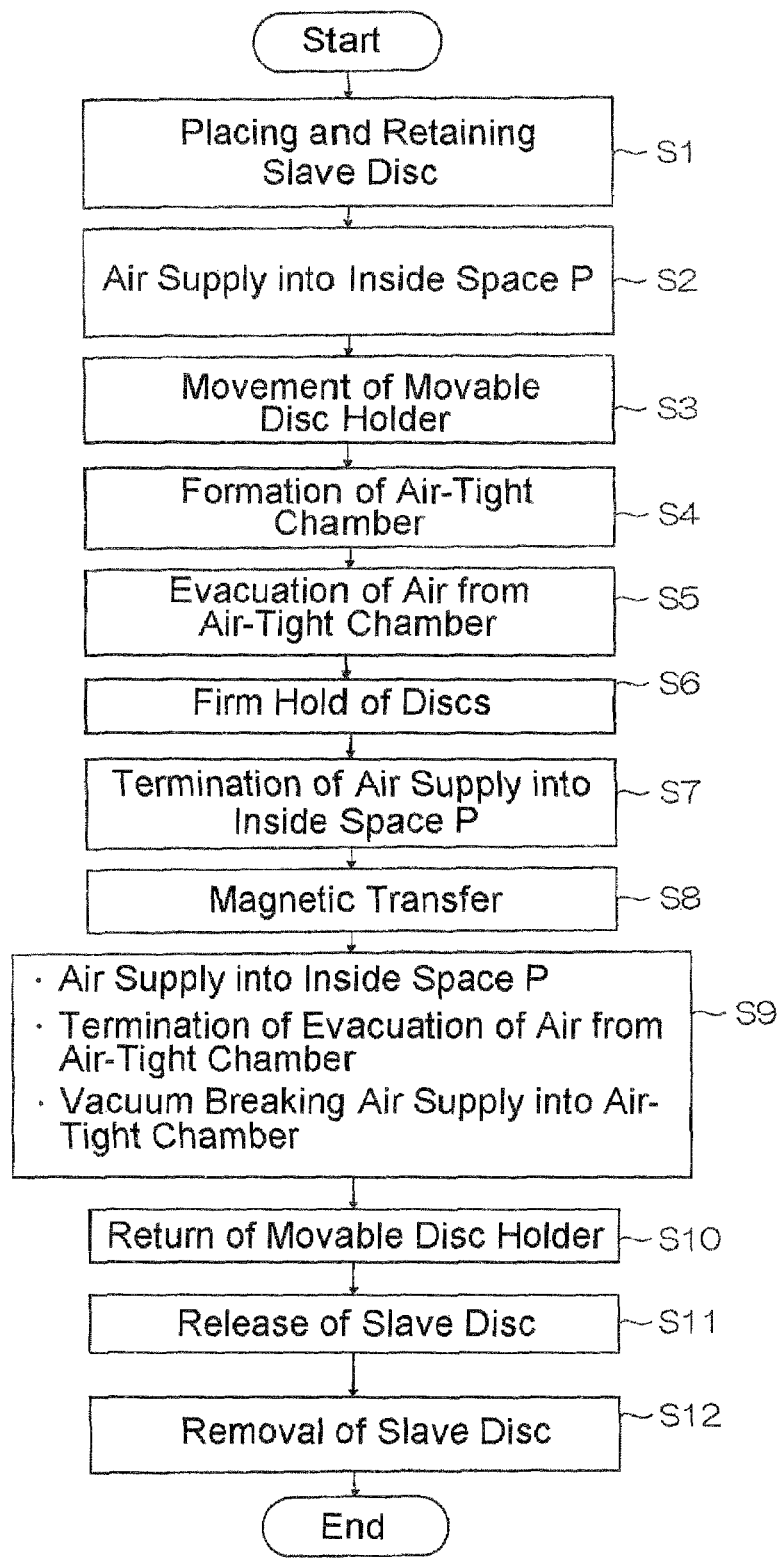
FIG. 8 illustrates a flowchart showing a sequential process of magnetic transfer using the magnetic transfer apparatus.

FIG. 8 is a flowchart illustrating a sequential process of magnetic transfer using the magnetic transfer apparatus 1. When the sequence process commences, the slave disc 91 is placed on top of the first master disc 92 by use of a disc manipulation head 50 such as shown in FIG. 9, and then retained there by air evacuation through the air suction passage 13f in step S1.

Figure 9:
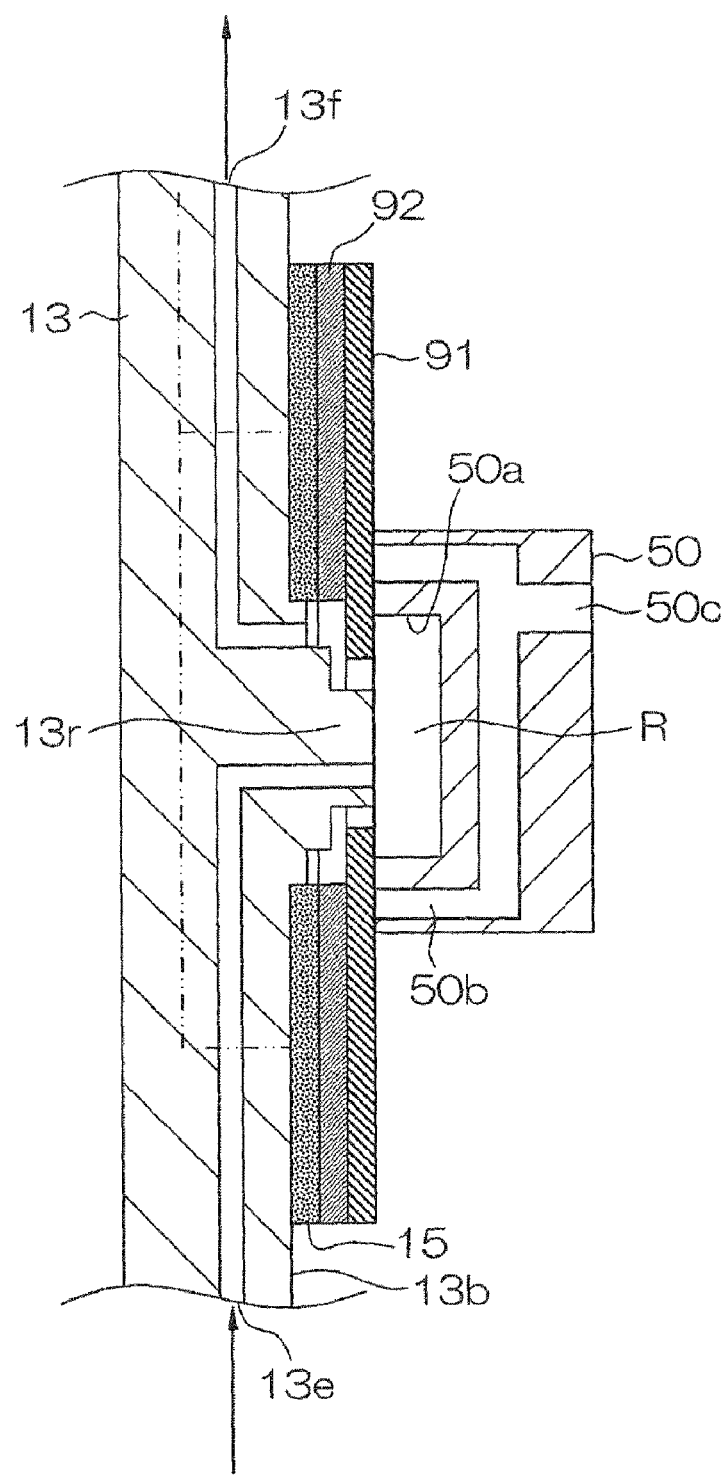
FIG. 9 illustrates, in schematic, simplified cross-sectional view, a disc manipulation head by way of example.
Figure 10:
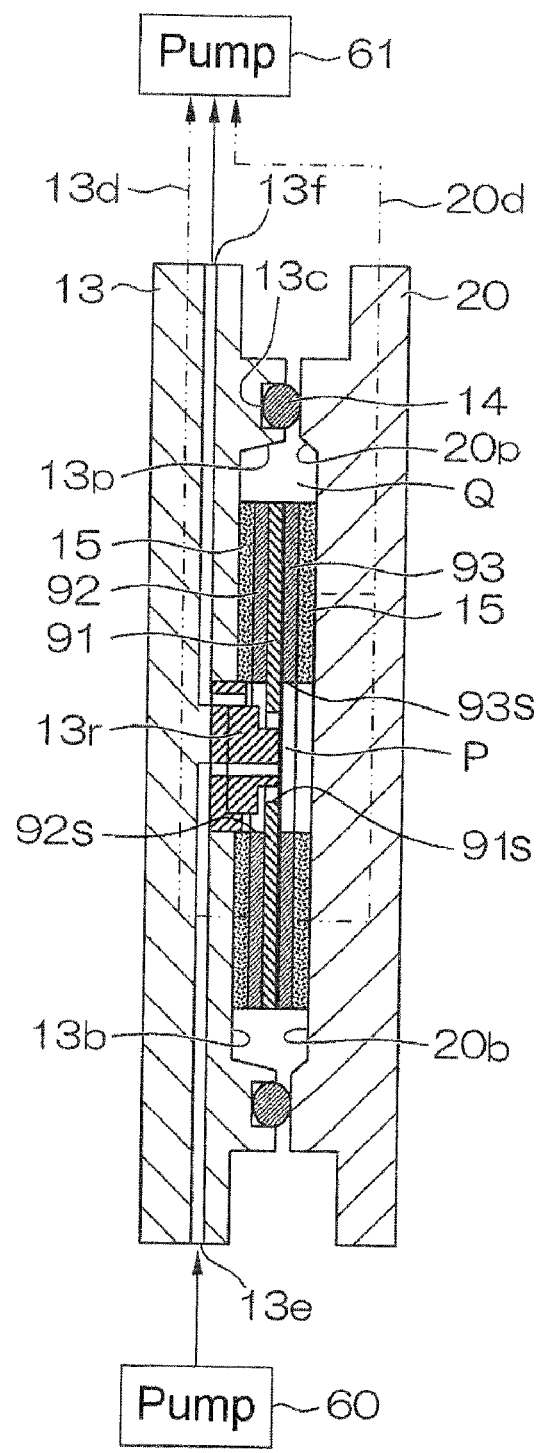
FIG. 10 illustrates, in detailed cross-sectional view, an alternate stationary disc holder and the movable disc holder of the magnetic transfer unit.

Referring to FIG. 9 schematically showing a disc manipulation head 50 by way of example, the disc manipulation head 50, which is generally cylindrically shaped, has an open-ended chamber 50a having an inside diameter greater that the spindle hole 91s of the slave disc 91 and a plurality of air suction passages 50b arranged at regular angular intervals around the open-ended chamber 50a. The air suction passages 50b are in communication with an air outlet 50c. The disc manipulation head 50 sticks fast the slave disc 91 from a feed tray (not shown) through air evacuation through the air suction passages 50b. Then the disc manipulation head 50 conveys the slave disc 91 in front of the first master disc 92 held on the disc holder 13 and brings it into contact with the first master disc 92. The suction manipulation head 50 is known in various forms and may take any form well known in the at. In this instance, when bringing the slave disc 91 into contact with the first master disc 92, it is preferred to maintain an interior space R defined within the open-ended chamber 50a under positive pressure. Specifically for this purpose, while evacuating air through the air suction passage 13f for holding the slave disc 91 on the disc holder 13, air is supplied into the interior space R within the open-ended chamber 50a through the air supply passage 13e. Hereby, the slave disc 91 is forced against the first master disc 92 by pressure of air supplied through the air supply passage 13e and concurrently attracted to the fist master disc 92 by evacuation of air through the air suction passage 13f. Consequently, the slave disc 91 remains in coaxial alignment with the first master disc 92 and is prevented from shifting its position with respect to the first master disc 92 even after detachment of the suction manipulation head 50 from the slave disc 91.

When proceeding to step S2, air is supplied to the inside space P (see FIG. 4) around the center boss 13r through the air supply passage 13e. In the case where air is supplied through the air supply passage 13e to force the slave disc 91 against the first master disc 92 during bringing the slave disc 91 into contact with the first master disc 92, the air supply may be continuously carried on. Thereafter, the movable disc holder unit 12 is moved toward the stationary disc holder unit 11 in step S3 until providing an enclosed air-tight chamber comprising inside and outside spaces P and Q, between the disc holders 13 and 20 in step S4. At this time, the second master disc 93 held on the disc holder 20 is forced against the slave disc 91 held on the disc holder 13. As a result the cushioning pads 15 and 25 generate repulsive force and the chamber formed between the recesses 13p and 20p of the disc holders 13 and 20 is air-tightly sealed by the O-ring 14.

Figure 11:
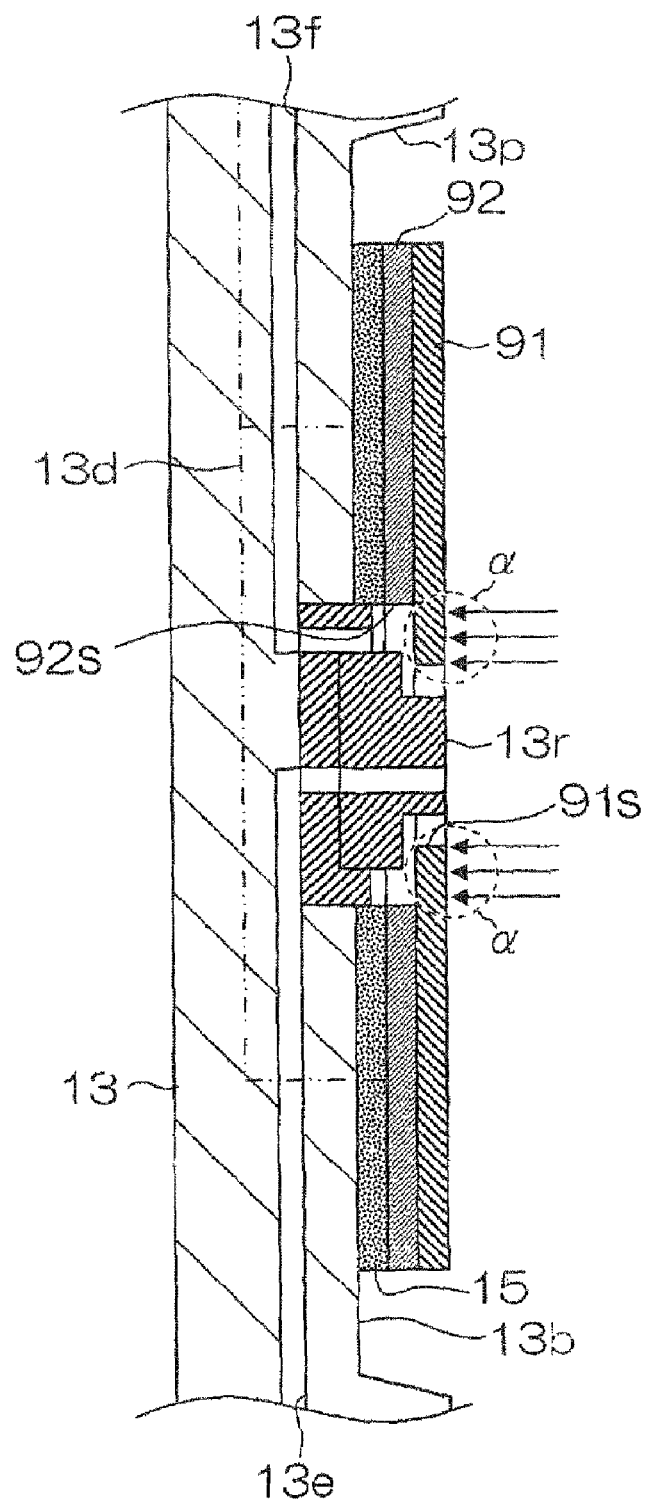
FIG. 11 illustrates, in explanatory view, the alternate stationary disc holder supplied locally with air pressure.

Subsequently, air in the inside and outside spaces P and Q is evacuated through the air suction passages 13f and 13g, respectively, in step S5. As described in connection with step S2, air is continuously supplied into the inside space P around the center boss 13r through the air supply passage 13e, so that a slave disc surface around the spindle hole 91s is locally maintained under positive pressure. In particular, as shown hi FIG. 11, a slave disc surface area α that extends inwardly beyond the first master disc 92 is pressed by air supplied through the air supply passage 13e. On that account, the slave disc 91 is prevented from shifting in position with respective to the first master disc 92 by retentive fore resulting from differential force between suction and depression. It is preferred to set a supply rate of air through the air supply passage 13e per unit of time to a smaller value than a total evacuation rate of air through the air supply passages 13f and 13g per unit of time so as thereby to reduce pressure in the enclosed airtight chamber comprising the spaces P and Q. I is also preferred that the center boss 13r is so configured as to have a top surface 13k flush with, or extending slightly beyond, the slave disc 91 in contact with the first master disc 92 held on the disc holder 11. Therefore, the air supply passage 13e opens in the inside space P in a plane flush with, or extending slightly beyond, the slave disc 91. This configuration of the center boss 13r of the disc holder 11 facilitates reliable air supply to the slave disc surface area α of the slave disc 91 through the air supply passage 13e.

In subsequent step S6, the slave disc 91 is firmly held between the first and second master discs 92 and 93 by evacuation of air from the spaces P and Q through the air suction passages 13f and 13g of the disc holder 13 and thereby extracting air slightly and locally retained in interfaces between the master and slave discs 91 and 92 and between the slave and master discs 91 and 93. As a result, the slave disc 91 is reliably brought into intimate contact with the first and second master discs 92 and 93. By that time, there is developed a vacuum in the enclosed air-tight chamber including the spaces P and Q. Further, as described in connection with step S5, the slave disc 91 is prevented from shifting in relative position with respect to the first master disc 92 with their axis lines aligned with one another by retentive force. Then, air supply into the inside space P through the air supply passage 13e is terminated in step S7. After terminating air supply into the inside space P and then evacuation of air from the inside and outside spaces P and Q through the air suction passages 13f and 13g, respectively, magnetic transfer is performed in step S8. Specifically, the magnetic field generating means 30 are actuated to apply magnetic fields to the first and second master discs 92 and 93 in intimate contact with the slave disc 91, thereby transferring patterned magnetic information on the first and second master discs 92 and 93 coincidentally to the magnetic layers on opposite sides of the slave disc 91. Since the slave disc 91 and the first and second master discs 92 and 93 remain coaxially aligned with one another, a pattern of transferred signals is prevented from being decentered with respect to the axis of the slave disc 91. That is, the pattern of transferred signals is prevented from involving omission and/or distortion of signals. As a result a high quality magnetic recording medium is provided.

In step S9 subsequent to completion of the magnetic transfer, immediately after resuming air supply into the inside space P through the air supply passage 13e and subsequently terminating the evacuation of air from the inside and outside spaces P and Q through the air suction passages 13f and 13g, respectively, vacuum breaking air is supplied into the inside and outside spaces P and Q through the air supply passages 13e and 13h. In consequence, a space over the surface of the slave disc 91 encompassed with the spindle hole 93s of the second master disc 93 is maintained under positive pressure. Thereafter, the movable disc holder unit 12 is moved away from the stationary disc holder unit 11 by actuating the shifting means 40 in step S10. Since air is still supplied into the inside space P through the air supply passage 13e during the movement of the movable disc holder unit 12, the slave disc surface area a extending inwardly beyond the first master disc 92 is put under positive pressure, so that the slave disc 91 is prevented from shifting in position with respective to the first master disc 92 by retentive force resulting from differential force between air evacuation and air supply. Finally, the evacuation of air through the air suction passage 13f is terminated in step S11 and, then, the slave disc 91 is removed from the disc holder 13 by the disc manipulation head 50 in step S12. In this instance, it is preferred to supply vacuum breaking air into the interior R of the open-ended chamber 50a of the disc manipulation head 50 through the air supply passage 13i (see FIGS. 5 and 7) so as to force the air to penetrate between the slave disc 91 and the first master disc 92, thereby assisting the slave disc 91 in breaking away from the first master disc 92. The vacuum breaking air supply facilitates reliable detachment of the slave disc 91 from the first master disc 92 by the disc manipulation head 50. Magnetic transfer of magnetic information from the first and second master discs 92 and 93 to the slave disc 91 is completed in this way.

In the above embodiment, it is preferred to set the supply rate of are through the air supply passage 13e per unit of time differently between steps S4 where the movable holder unit 12 is moved toward the stationary disc holder unit 11 and S10 the movable holder unit 12 is moved away from the stationary disc holder unit 1, more specifically, to adjust the air supply rate per unit of time in step S10 greater than that in step S4.

Figure 12:
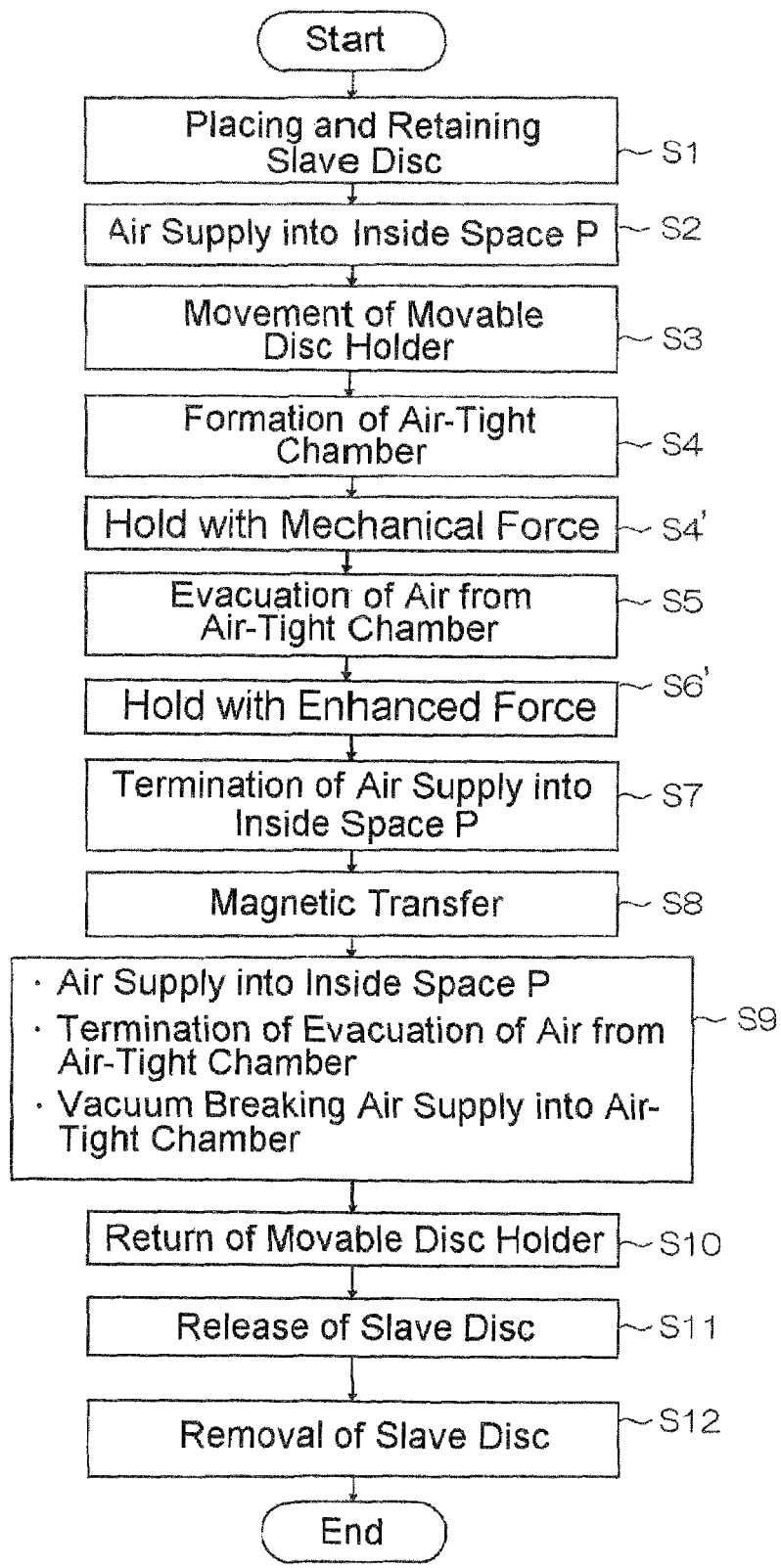
FIG. 12 illustrates a flowchart showing an alternate sequential process of magnetic transfer using the magnetic transfer apparatus.

FIG. 12 is a flowchart illustrating a modified sequential process of magnetic transfer using the magnetic transfer apparatus 1 which is different from the sequential process illustrated in FIG. 8 only in the following steps. In the modified sequential process of magnetic transfer includes, between steps S4 and S5, an additional step S4' for holding the slave disc 91 tight between the first and second master discs 92 and 93 by subsidiarily applying mechanical thrust force onto the slave disc 91 through the second master disc 93 held the disc holder 20. The mechanical thrust force is created by continuative operation of the shifting means 40 to produce additional slight movement of the disc holder unit 12 toward the stationary disc holder unit 11 still after formation of an enclosed air-tight chamber formed between the recesses 13p and 20p of the disc holders 13 and 20 in step S4 so that the second master disc 93 is pressed against the slave disc 91 borne on the first master disc 92. In this way, the slave disc 91 is firmly held between the first and second master discs 92 and 93 even before commencement of evacuation of air from the enclosed air-tight chamber, comprising the inside and outside spaces P and Q, provided between the disc holders 13 and 20. The alternate sequential process of magnetic transfer includes, in place of step S6, step S6' where the magnetic transfer unit 10 performs substantially the same operation as in step S6. That is, the slave disc 91 is held between the first and second master discs 92 and 93 with force resulting from evacuation of air from the spaces P and Q through the air suction passages 13f and 13g of the disc holder 13 in addition to the mechanical thrust force applied in step S4'. Accordingly, the slave disc 91 is firmly held between the first and second master discs 92 and 93 with enhanced force, and, at the same time, air locally retained in interfaces between the slave and master discs 91 and 92 and between the slave and master discs 91 and 93 is extracted.

In an alternate embodiment of the sequential processes of magnetic transfer illustrated in FIGS. 8 and 12, the slave disc 91 placed on top of the first master disc 92 may be retained at its outer periphery by air evacuation in step S1 and air is supplied into the outside space Q accordingly in steps S2 and S9.

Figure 13:
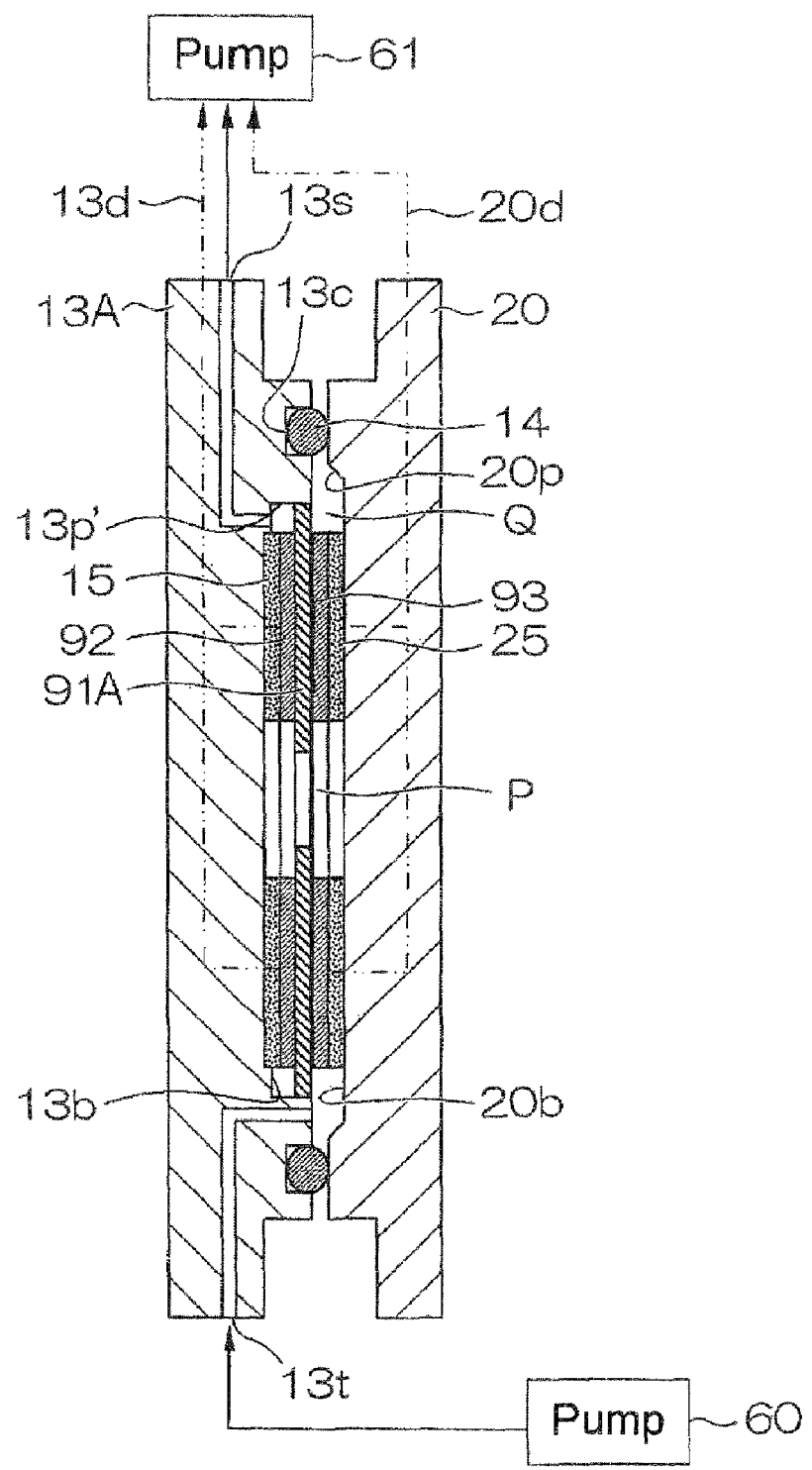
FIG. 13 illustrates, in detailed cross-sectional view, a stationary disc holder and a movable disc holder of a magnetic transfer unit according to another embodiment.

FIG. 13 illustrates, in cross-sectional view, a disc holder 13A of a stationary disc holder unit 11 and a disc holder 20A of a movable disc holder unit 12 of the magnetic transfer unit 10 for suitably carrying out the alternate sequential processes of magnetic transfer. The alternate embodiment is preferably used for magnetic transfer of a slave disc 91A having an outer diameter greater than the first and second master discs 92 and 93. The disc holder 13A is similar in structure and operation to the disc holder 13A except for having a recess 13p' having an inside diameter adapted to fit the slave disc 91A, is provided with an air supply passage 13t connected to a pump 60 and an air suction passage 13s connected to a pump 61, respectively in place of the air supply passage 13e and an air suction passage 13f. On the other hand, the disc holder 20A is just the same in structure and operation as that of the previous embodiment. The air supply passage 13t extends from an outer periphery of the disc holder 13A and turns upward outside the recess 13p' to open an outside space Q around an outer peripheral portion of the slave disc 91 beyond the first and second master discs 92 and 93 so as to supply air into the outside space Q. The air suction passage 13s extends, diametrically opposite to the air supply passage 13t, from the outer periphery of the disc holder 13A and turns upward to open to the outside space Q around an outer peripheral portion of the slave disc 91 beyond the first master disc 92 in the recess 13p' so as to evacuate air from an outside space around an outer peripheral portion of the first master disc 92.

According to the magnetic transfer unit 10, evacuation of air from the space around the outer peripheral portion of the slave disc 91 beyond the first master disc 92 through the air suction passage 13s produces retentive force resulting from differential force between suction and depression with which the slave disc 91 is prevented from shifting in position with respect to the first and second master discs 92 and 93.

In the above embodiments, the slave disc 91 placed on top of the first master disc 92 may be retained at both outer and inner peripheries by air evacuation in step S1 and air is supplied into the inside and outside spaces P and Q accordingly in steps S2 and S9.

It is to be understood that, although the magnetic transfer apparatus has been described taking a horizontal axis type as an example, it may be of a vertical axis type and of an inclined axis type. It is also to be understood that although the present invention has been described with regard to preferred embodiments thereof, various other embodiments and variants may occur to those skilled in the art, which are within the scope and spirit of the invention, and such other embodiments and variants are intended to be closed by the following claims.

What is claimed is:

1. A magnetic transfer apparatus for magnetically transferring patterned magnetic information of a master disc to a double-sided slave disc by applying a magnetic field to the master disc in contact with the double-sided slave disc, said magnetic transfer apparatus comprising:

a first disc holder device having a recess for holding a first master disc and a double-sided slave disc in contact with each other therein, said first master disc having a spindle hole greater than a spindle hole of said double-sided slave disc;

a second disc holder device having a recess for holding a second master disc, said second master disc having a spindle hole with a same diameter as the spindle hole of said first master disc;

a shifting device for shifting said first disc holder device and said second disc holder device relatively toward each other to form an air-tight chamber between said recesses of said first disc holder device and said second disc holder device and away from each other to open said air-tight chamber, said double-sided slave disc being brought into contact with said second master disc so as to be sandwiched between said first master disc and said second master disc when said air-tight chamber is formed between said recesses of said first disc holder device and said second disc holder device;

an air supply device for supplying air into a space formed above a peripheral portion of said double-sided slave disc beyond said second master disc; and a control device for controlling said air supply device to supply air into said space above said peripheral portion of said double-sided slave disc beyond said second master disc at least either during formation of said air-tight chamber or during opening of said air-tight chamber, wherein air is supplied at a supply rate per unit of time different than a supply rate during formation of said air-tight chamber and a supply rate during opening of said air-tight chamber.

2. The magnetic transfer apparatus as defined in claim 1, further comprising:

an air evacuation device for evacuating air from said air-tight chamber so as to hold said first master disc and said double-sided slave disc in contact on said first disc holder device with a vacuum, wherein said air supply device supplies air so as to develop positive pressure acting on said space above said peripheral portion of said double-sided slave disc beyond said second master disc.

3. The magnetic transfer apparatus as defined in claim 2, wherein said control device controls so that, while said air supply device supplies air into said space above said peripheral portion of said double-sided slave disc beyond said second master disc, said air evacuation device evacuates air from said air-tight chamber so as to hold and sandwich said double-sided slave disc between said first master disc and said second master disc in intimate contact with one another.

4. The magnetic transfer apparatus as defined in claim 3, wherein said control device controls said shifting device to slightly move said second disc holder device toward said first disc holder device still after complete formation of said air-tight chamber between said recesses of said first disc holder device and said second disc holder device so as thereby to subsidiarily apply mechanical thrust force onto said double-sided slave disc through said second master disc.

5. The magnetic transfer apparatus as defined in claim 1, wherein said air supply device comprises an air supply passage opening to said space either in a plane flush with, or in a plane slightly beyond, said double-sided slave disc to be placed in contact with said first master disc held on said first disc holder device.

6. A magnetic transfer method of magnetically transferring patterned magnetic information of a master disc to a double-sided slave disc by applying a magnetic field to the master disc in contact with the double-sided slave disc, said magnetic transfer method comprising the steps of:

shifting a first disc holder device having a recess in which a first master disc and a double-sided slave disc are held in contact with each other and a second disc holder device having a recess in which a second master disc is held relatively toward each other to form an air-tight chamber between said recesses of said first disc holder device and said second disc holder device;

holding and sandwiching said double-sided slave disc between said first master disc and said second master disc;

magnetically transferring patterned magnetic information of said first master disc and said second master disc to said double-sided slave disc; and shifting said first disc holder device and said second disc holder device relatively away from each other to open said air-tight chamber, wherein air is supplied into a space formed above a peripheral portion of said double-sided slave disc beyond said second master disc at least either in said step of holding and sandwiching said double-sided slave disc between said first master disc and said second master disc or in said step of opening said air-tight chamber, and wherein air is supplied into said space at a supply rate per unit of time different between said step of holding and sandwiching said double-sided slave disc between said first master disc and said second master disc and said step of opening said air-tight chamber.

7. The magnetic transfer method as defined in claim 6, wherein said step of holding and sandwiching said double-sided slave disc between said first master disc and said second master disc is achieved by means of evacuation of air from said air-tight chamber; and wherein said space formed above a peripheral portion of said double-sided slave disc beyond said second master disc which is supplied with air is maintained under positive pressure.

8. The magnetic transfer method as defined in claim 6, wherein air is supplied into said space either from a plane flush with, or from a plane slightly beyond, said double-sided slave disc placed in contact with said first master disc held on said first disc holder device.

9. The magnetic transfer method as defined in claim 6, wherein, in said step of holding and sandwiching said double-sided slave disc between said first master disc and said second master disc, air is evacuated from said air-tight chamber so as to hold and sandwich said double-sided slave disc between said first master disc and said second master disc in intimate contact with one another while air is supplied into said space above said peripheral portion of said double-sided slave disc beyond said second master disc.

10. The magnetic transfer method as defined in claim 6, wherein, in said step of holding and sandwiching said double-sided slave disc between said first master disc and said second master disc, said second disc holder device and said first disc holder device are slightly moved relatively toward each other still after formation of said air-tight chamber between said first disc holder device and said second disc holder device so as thereby to subsidiarily apply mechanical thrust force onto said double-sided slave disc through said second master disc.

11. A magnetic recording medium comprising said double-sided slave disc to which patterned magnetic information has been magnetically transferred from said first and second master discs by way of said magnetic transfer method as defined in claim 6.

12. A magnetic recording medium comprising said double-sided slave disc to which patterned magnetic information has been magnetically transferred from said first and second master discs by way of said magnetic transfer method as defined in claim 7.

13. A magnetic recording medium comprising said double-sided slave disc to which patterned magnetic information has been magnetically transferred from said first and second master discs by way of said magnetic transfer method as defined in claim 8.

14. A magnetic recording medium comprising said double-sided slave disc to which patterned magnetic information has been magnetically transferred from said first and second master discs by way of said magnetic transfer method as defined in claim 9.

15. A magnetic recording medium comprising said double-sided slave disc to which patterned magnetic information has been magnetically transferred from said first and second master discs by way of said magnetic transfer method as defined in claim 10.

* * * * *